No. 892,805. PATENTED JULY 7, 1908.
J. W. P. BURDINE.
RECORDER FOR SAWMILLS.
APPLICATION FILED OCT. 28, 1907.
5 SHEETS—SHEET 1.
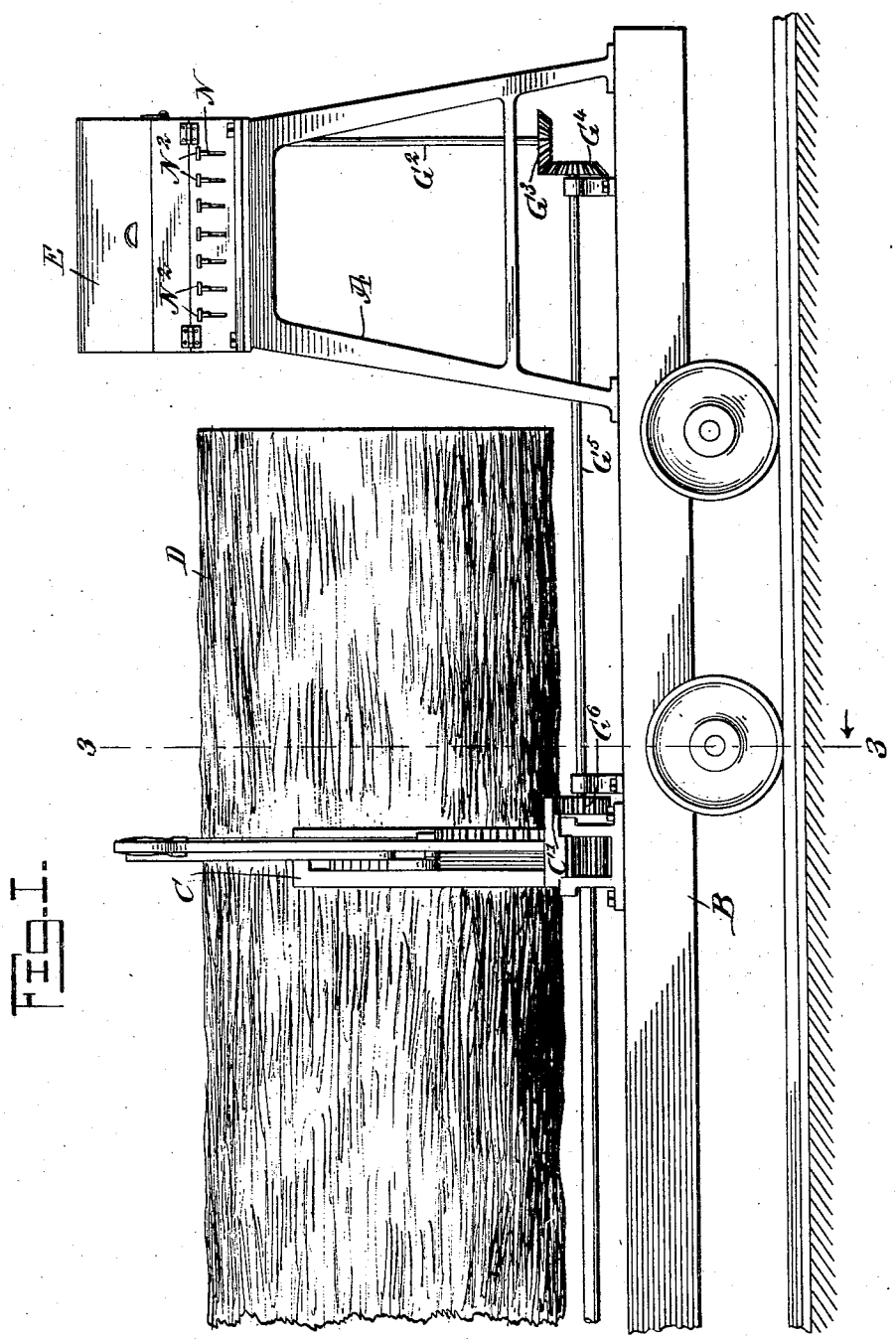
WITNESSES
INVENTOR
James William Preston Burdine
BY
ATTORNEYS No. 892,805. PATENTED JULY 7, 1908.
J. W. P. BURDINE.
RECORDER FOR SAWMILLS.
APPLICATION FILED OCT. 28, 1907.
5 SHEETS—SHEET 2.
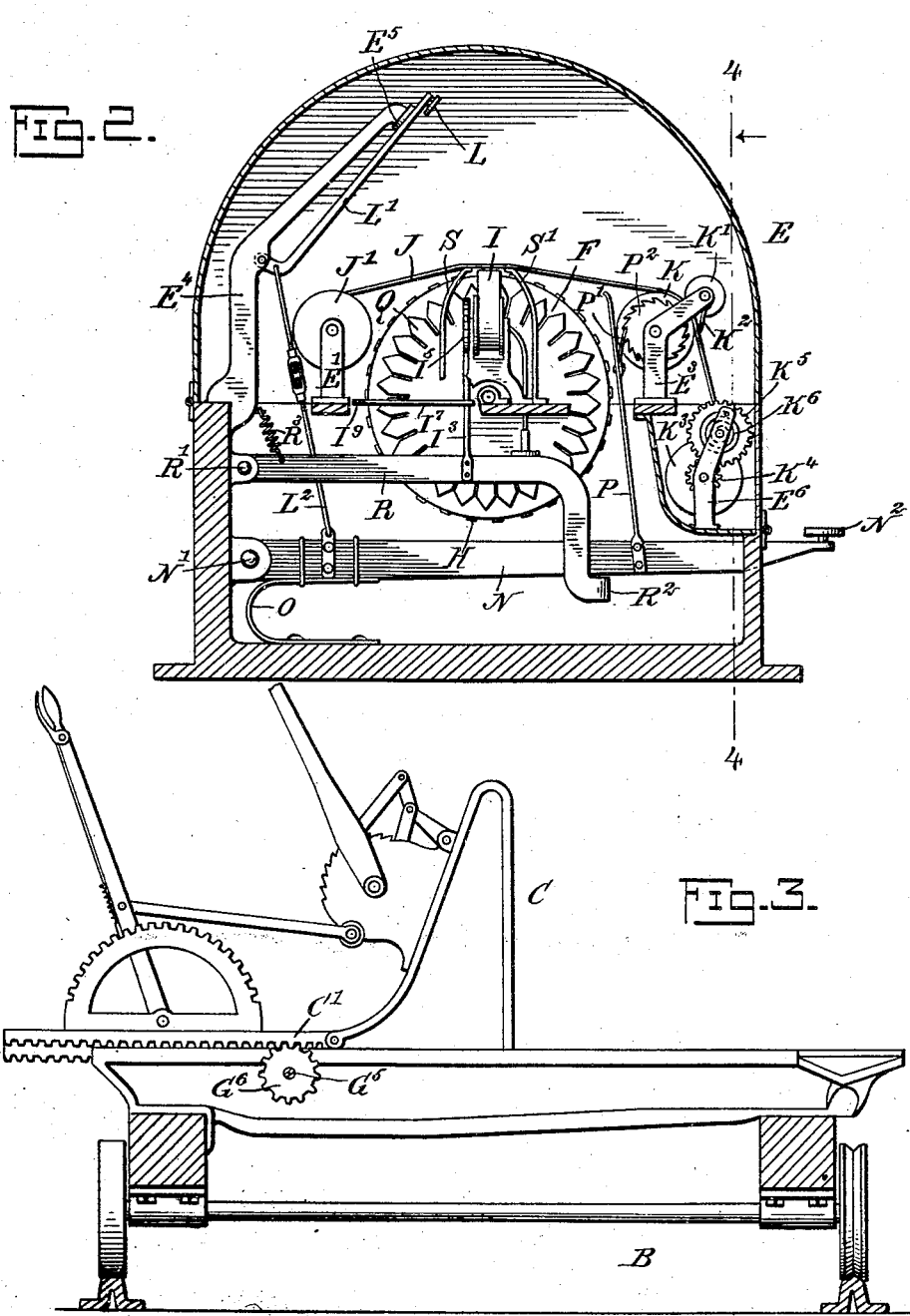
WITNESSES
G. R. Thomas
INVENTOR
James William Preston Burdine
BY
ATTORNEYS

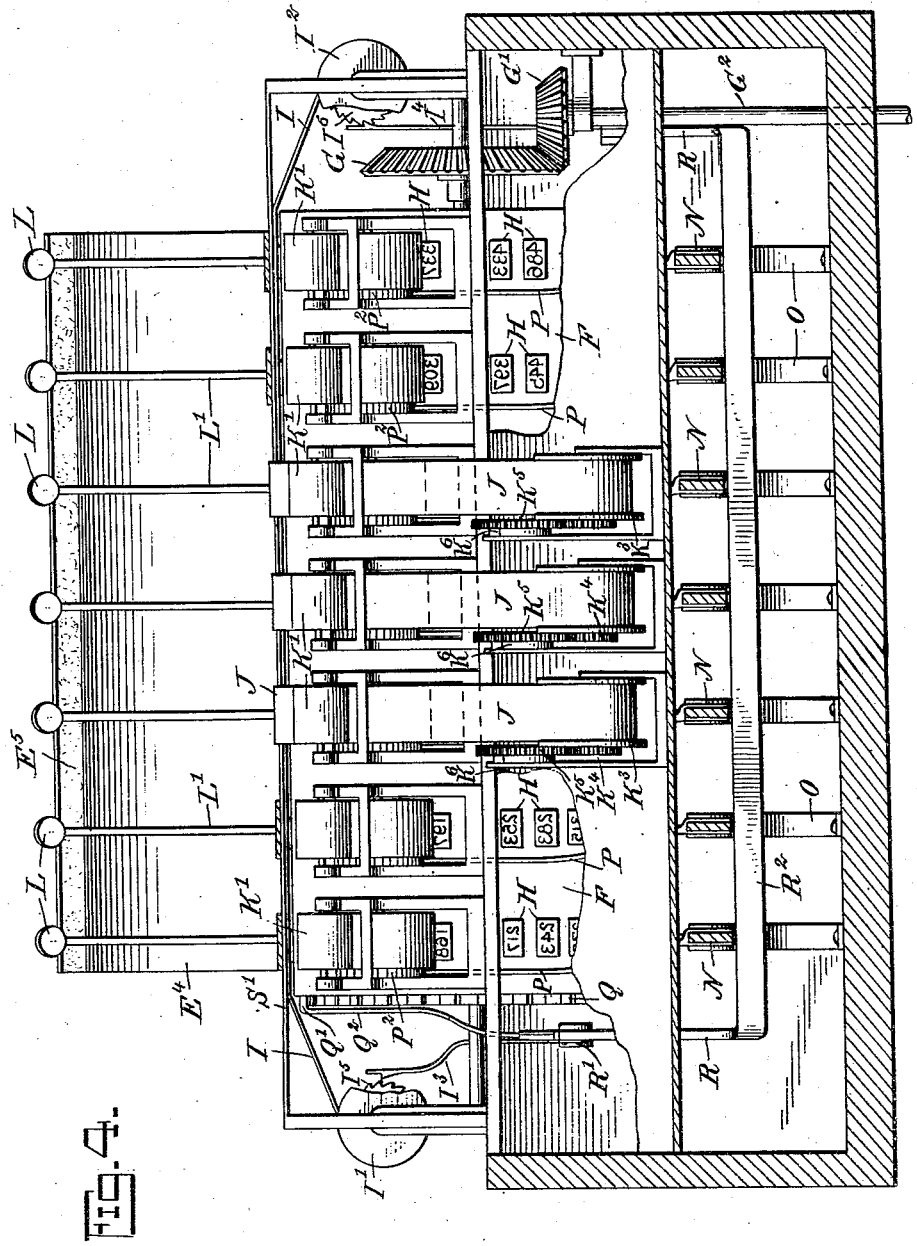

No. 892,805. PATENTED JULY 7, 1908.
J. W. P. BURDINE.
RECORDER FOR SAWMILLS.
APPLICATION FILED OCT. 28, 1907.

5 SHEETS—SHEET 4.

WITNESSES
G. R. Thomas
Rev. J. Hooster

INVENTOR
James William Preston Burdine
BY
Munn & Co.
ATTORNEYS

No. 892,805. PATENTED JULY 7, 1908.
J. W. P. BURDINE.
RECORDER FOR SAWMILLS.
APPLICATION FILED OCT. 28, 1907.

5 SHEETS—SHEET 5.

WITNESSES
G. R. Thomas

INVENTOR
James William Preston Burdine
BY Munn & Co.
ATTORNEYS

UNITED STATES PATENT OFFICE.

JAMES WILLIAM PRESTON BURDINE, OF LAKE ARTHUR, LOUISIANA.

RECORDER FOR SAWMILLS.

No. 892,805.     Specification of Letters Patent.     Patented July 7, 1908.

Application filed October 28, 1907. Serial No. 399,579.

*To all whom it may concern:*

Be it known that I, JAMES WILLIAM PRESTON BURDINE, a citizen of the United States, and a resident of Lake Arthur, in the parish of Calcasieu and State of Louisiana, have invented a new and Improved Recorder for Sawmills, of which the following is a full, clear, and exact description.

The invention relates to saw mills, and its object is to provide a new and improved recorder, forming a permanent feature of a saw mill, and arranged to form a permanent record of the amount of board measure contained in the logs sawed by the saw mill.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 5:
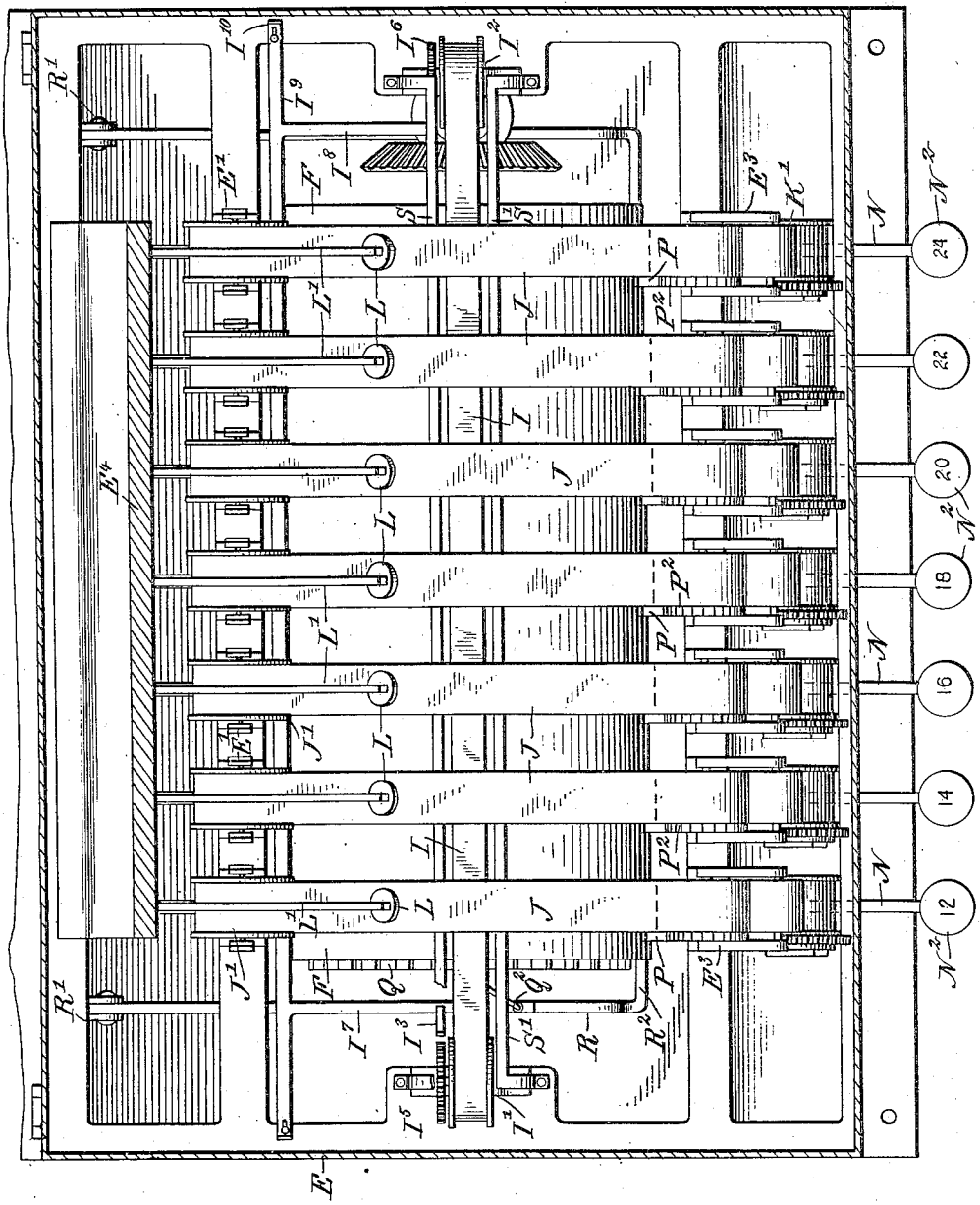
Figure 6:
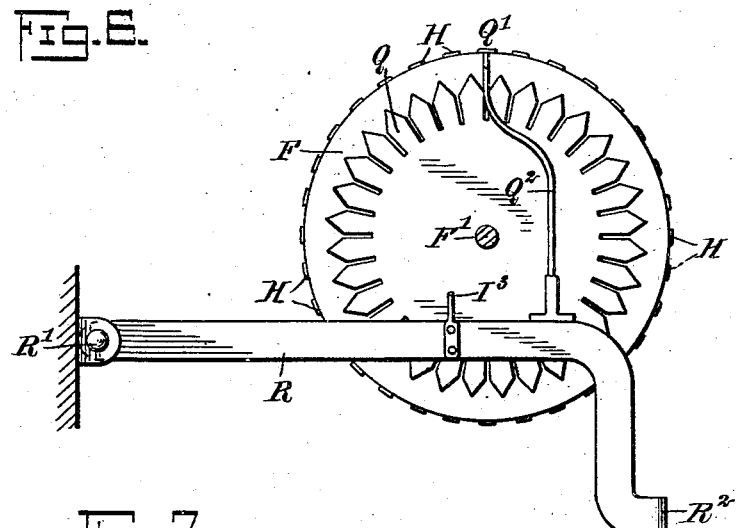
Figure 7:
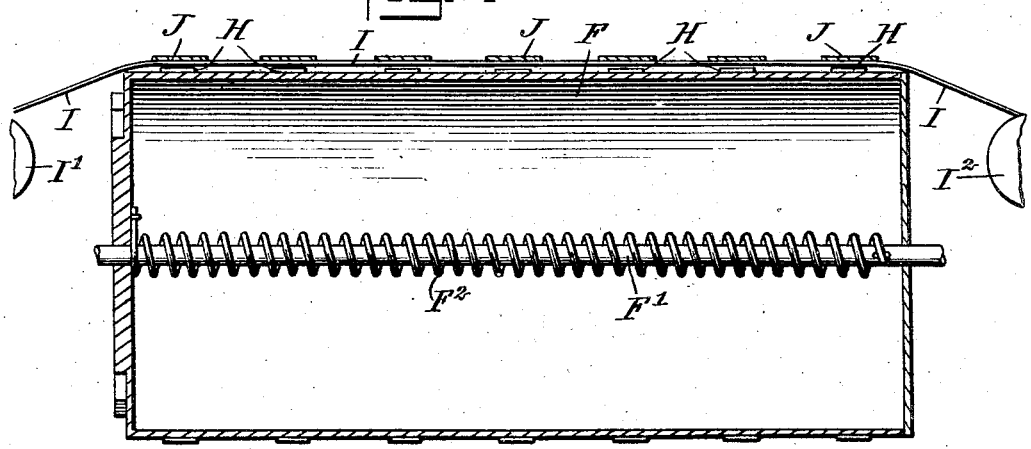
Figure 8:
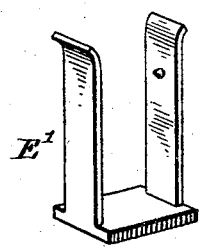

Figure 1 is a side elevation of the improvement as applied to the saw mill carriage supporting a log to be sawed; Fig. 2 is an enlarged transverse section of the improvement; Fig. 3 is a similar view of the same on the line 3—3 of Fig. 1; Fig. 4 is an enlarged sectional elevation of the improvement on the line 4—4 of Fig. 2; Fig. 5 is a plan view of the same, the casing being shown in section; Fig. 6 is an end view of the printing cylinder and the means for adjusting and locking the same; Fig. 7 is a longitudinal sectional elevation of the printing cylinder, the inking ribbon and the strips of paper on which the impressions are made; and Fig. 8 is a perspective view of one of the paper roll holders.

The recorder is mounted on a suitable framework A, attached to one end of the saw mill carriage B of a saw mill of any approved construction, the said carriage being provided with a head block C, capable of transverse movement on the carriage, and adapted to be set according to the diameter of a log D, to be cut into boards or other lumber by the saw of the saw mill.

In the casing E of the recorder is arranged a printing cylinder F, normally turning with its shaft F' by the action of a spring $F^2$, coiled on the shaft F' and secured with one end to the shaft and with its other end to the end of the printing cylinder F, to allow the latter to turn with the shaft, as hereinafter more fully described. One end of the shaft F' is connected by a bevel gear wheel G with a bevel gear wheel G', secured on the upper end of a shaft $G^2$, journaled in suitable bearings arranged on the framework A and the casing E, and on the lower end of the said shaft $G^2$ is secured a bevel gear wheel $G^3$ in mesh with a bevel gear wheel $G^4$, attached to a longitudinally extending shaft $G^5$, journaled in suitable bearings arranged on the saw mill carriage B. On the shaft $G^5$ is secured a gear wheel $G^6$ in mesh with a rack C' secured to or forming part of the head block C, so that when the latter is shifted transversely on the saw mill carriage B then the rack C' rotates the gear wheel $G^6$, whereby the shaft $G^5$ is turned. The rotary motion of the shaft $G^5$ is transmitted by the gear wheels $G^4$, $G^3$ to the shaft $G^2$, and the rotary motion of the latter is transmitted by the gear wheels G', G to the shaft F', to rotate the printing cylinder F, it being understood that the cylinder F is normally carried along by the action of the spring $F^2$.

By the arrangement described, the printing cylinder F is turned correspondingly to the distance the head block C is moved on the carriage B, that is, the printing cylinder F is turned correspondingly to the diameter of the log D held on the saw mill carriage B.

On the printing cylinder F are peripherally arranged sets of type H, representing board measure for different lengths of logs. For instance, the left hand set of type represents board measure for logs twelve feet long and of any diameter, while the next set of type indicates board measure for fourteen feet logs of any diameter, and so on. It is understood that I do not limit myself to the particular sets of types shown, as in practice the recorder embraces such length of logs as are usually cut by a saw mill, and logs of diameters running, say, from eight to forty or more inches in diameter.

Over the type of the printing cylinder F extends, lengthwise thereof, an inking ribbon I, unwinding from a ribbon holder I' and winding up on a roller $I^2$, both rollers I' and $I^2$ being journaled in suitable bearings arranged in the casing E. The inking ribbon I thus extends over the type of the several sets of type at the top of the cylinder F at the time, and above the inking ribbon I and in transverse alinement with the several sets of type H, are arranged strips of paper J, each unwinding from a roll of paper J', journaled on a suitable bracket E', arranged in the casing E at the rear side thereof. The forward end of each strip of paper passes between feed rollers K and K' journaled in brackets E³, arranged in the casing E. Now in order to make an impression, a platen L is provided for each set of type H, each platen L being held on a lever L' journaled on a bracket E⁴, arranged in the casing E, and the lever L' is pivotally connected by an adjustable link L² with a key N, fulcrumed at N' at the rear side of the casing E, the forward end of the key N extending through a slot in the front of the casing E. The outer ends of the several keys N are provided with finger-pieces N², bearing numerals corresponding to the length of the logs to be sawed by the saw mill C, the said numerals bearing a corresponding relation to the numerals of the type H representing board measure for different diameters of logs in inches and the corresponding length of the logs in feet. Now when the head block C is set for a log D of say twenty-four inches in diameter, then the cylinder F is turned correspondingly, so that the types H for the board measure of twenty-four-inch diameter logs appear at the top of the cylinder, and when the operator now presses the finger-piece N² bearing the numeral for the length of the log D on the saw mill carriage B at the time, then the corresponding platen L is swung downward, to cause an impression to be made on the strip of paper J, the impression corresponding to the numeral of the type H, and indicating the full board measure of the log D on the carriage B at the time. Thus if the log D is twelve feet long, the finger-piece N² to the extreme left will be pressed by the operator, but if the log is eighteen feet long then the middle finger-piece will be pressed, and if the log is twenty-four feet long the finger-piece N² at the extreme right will be pressed by the operator. Now if the log D is say twelve feet long and twenty inches in diameter, then the numeral 192 will be printed on the strip of paper J by the corresponding type of the first set of type H on the left-hand side of the printing cylinder F, the said numeral 192 indicating the feet board measure of the log. It is understood that in this case the key N bearing the numeral 12 is pressed at the time the head block C is set to twenty inches. If a log D is twenty-four feet long and say twenty-four inches in diameter, then the numeral 600 (that is, the feet board measure for such size log) is printed on the strip of paper J for the key N marked "24", and in this manner the board measure for the logs sawed by the saw mill is recorded and a permanent record made thereof on the several strips of paper J.

From the foregoing it will be seen that the printing cylinder F is turned a distance corresponding to the diameter of the log to be sawed at the time and in place on the saw mill carriage B, and the impression is made by the corresponding key N according to the length of the log.

The strip of paper J printed on at the time of pressing a key N, is fed forward on the release of the key, the latter being returned to its normal position by a spring O. Now for the purpose mentioned, each key N is provided with an upwardly extending arm P, carrying a pawl P', engaging a ratchet wheel P², secured to and forming part of the corresponding feed roller K. Now when the key N is pressed, the pawl P' glides over the teeth of the ratchet wheel P², and when the key N is released and swings upward by the action of its spring O, then the pawl P' turns the ratchet wheel P² and consequently the corresponding feed roller K, to feed the strip of paper J forward, to bring a blank piece of paper over the type on top of the printing cylinder F at the time.

In order to adjust and lock the printing cylinder F in place during the time an impression is to be made on pressing the corresponding key N, the following arrangement is made: On one end of the printing cylinder F is secured a toothed wheel Q, adapted to be engaged by the angular end Q' of an arm Q², secured on a lever R, fulcrumed at R' at the rear side of the casing E, the forward end of the lever R being provided with a longitudinally extending bar R², extending under the several keys N, so that when one of the keys is pressed, as previously explained, then a downward swinging motion is given to the lever R, to move the angular end Q' of the arm Q² into engagement with the adjacent teeth of the toothed wheel Q. When this takes place, the toothed wheel Q and consequently the printing cylinder F are locked against rotation. The teeth of the toothed wheel Q are preferably pointed, as plainly indicated in Figs. 2 and 6, so that when the diameter of a log D is a fraction more than a whole number, then the printing cylinder F is turned a corresponding distance, and when a key N is now pressed and the lever R swings downward, then the angular arm Q' engages the corresponding side of the pointed end of the tooth of the wheel Q, to turn the printing cylinder F either forward or backward, until the angular arm Q' passes accurately between adjacent teeth of the wheel Q. Thus, if the fraction is less than one-half, the cylinder F is turned backward, but if it is more than one-half, it is turned a corresponding distance forward, to insure correct recording of the amount of board measure in the log.

The lever R is normally held in an uppermost position by the action of a spring R³ (see Fig. 2), and on the said lever R are secured upwardly extending spring pawls I³ I⁴ adapted to engage ratchet wheels I⁵, I⁶ secured to the ribbon rollers I' and I². The pawls I³, I⁴ are adapted to be engaged by arms I⁷, I⁸ held on a shifting bar I⁹, mounted to slide longitudinally in the casing E and provided at one end with a handle I¹⁰, adapted to be taken hold of by the operator to shift the bar I⁹ either to the right or left, to move one of the pawls I³, I⁴ out of mesh with the corresponding ratchet wheel I⁵ or I⁶, while the other pawl I⁴ or I³ moves in mesh with the corresponding ratchet I⁶ or I⁵. Now when the lever R is on the return or upward stroke, the pawl I³ or I⁴ in mesh at the time with the corresponding ratchet wheel I⁵ or I⁶, turns the latter and the corresponding ribbon roller I' or I², to shift the ribbon I longitudinally. Thus, by the arrangement described, clear impressions are always had on the strips of paper J.

In order to support the strips of paper J in proper position over the inking ribbon I, longitudinally supporting bars S and S' are provided, located on opposite sides of the inking ribbon I, for holding the paper above the latter, as will be readily understood by reference to Figs. 2 and 5. The upward swinging motion of the levers L' carrying the platen L is limited by stops E⁵, arranged on the bracket E⁴.

Each strip of paper J after it leaves the rollers K, K' winds on a roller K³, journaled on a suitable bracket E⁶ arranged in the casing E, and the roller K³ is connected by a pinion K⁴, with a gear wheel K⁵ pressed on by a coil spring K⁶, to drive the roller K³ with a view to wind up the strip of paper on the said roller K³. By providing a single strip of paper J for each set of type H on the printing cylinder F, each strip of paper receives thereon in succession and without large intervening spaces, the numerals of the logs of the same length for each strip, and hence the numerals on each strip can be readily added up to give the total. It will also be seen that a new strip of paper J may be readily inserted in case one is used up, and hence it is not necessary to disturb the other strips of paper not yet used up.

The printing cylinder F is free to rotate independently of the impression devices, and the printing cylinder rotates forward and backward on moving the head block C transversely in a corresponding direction, but the proper key N is not pressed until the head block and the printing cylinder are at rest, that is, at the time the head stock has been set to the exact diameter of the log to be sawed, and the corresponding longitudinal row of types H is on the top of the printing cylinder F.

In case the diameter of the log is a fraction of an inch over or under a certain number of inches and the key N is pressed, then the printing cylinder F is slightly turned forward or backward on its now stationary shaft F' and against the tension of the spring F², until the lug Q' has passed between a pair of teeth on the wheel Q as previously explained. When the key is released and the lug Q' moves out of engagement with the teeth, then the printing cylinder F returns to its normal position on the shaft F' by the action of the spring F².

Although I have described the several mechanisms in detail, it is evident that other mechanisms for accomplishing the same or a similar result may be used, and hence I do not limit myself to the detail mechanisms shown and described, as the same may be varied without deviating from my invention.

Having thus described my invention, I claim as new and desire to secure by Letters Patent:

1. A recorder for saw mills, comprising a printing cylinder having peripherally arranged sets of type representing board measure for different lengths of logs, a paper feed for feeding a strip of paper over each set of type, and a key-controlled platen for producing an impression on the strip of paper over the corresponding type.

2. A recorder for saw mills, comprising a printing cylinder having peripherally arranged sets of type representing board measure for different lengths of logs, a paper feed for feeding a strip of paper over each set of type, a key-controlled platen for producing an impression on the strip of paper over the corresponding type, and means for turning the said printing cylinder and controlled by the movement of the head block of the saw mill.

3. A recorder for saw mills, comprising a printing cylinder having peripherally arranged sets of type representing board measure for different lengths of logs, a paper feed for feeding a strip of paper over each set of type, and a key-controlled platen for producing an impression on the strip of paper over the corresponding type, the said paper feed being controlled by the said key-controlled platen.

4. The combination with a saw mill carriage, of a recorder mounted on the saw mill carriage and comprising a printing mechanism for permanently recording the board measure of the logs cut into lumber on the saw mill.

5. The combination with a saw mill carriage, of a recorder mounted on the said carriage, for recording the board measure of the logs cut into lumber on the saw mill, a head block movable on the carriage and automatically controlling said recorder in part, and means for manually controlling said recorder in part.

6. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, and a manually controlled key for actuating the said platen.

7. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, a manually controlled key for actuating the said platen, and means connecting each key with the corresponding paper feed, to actuate the same on the return of the key.

8. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, a manually controlled key for actuating the said platen, and a locking and adjusting device for the said printing cylinder, to adjust and lock the same on pressing a key.

9. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, a manually controlled key for actuating the said platen, a toothed wheel on the said printing cylinder, a pawl for engaging the said toothed wheel, and a lever carrying the pawl and actuated on pressing a key to lock the printing cylinder during the time an impression is made.

10. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, a manually controlled key for actuating the said platen, and a gearing for rotating the said printing cylinder.

11. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, a manually controlled key for actuating the said platen, a gearing for rotating the said printing cylinder, and means for actuating the said gearing from the head block of the saw mill carriage.

12. A recorder for saw mills, comprising a printing cylinder having peripherally arranged sets of type representing board measure for different lengths of logs, paper feeds for feeding strips of paper over each set of type, a carrier for an inking ribbon extending lengthwise of the said printing cylinder intermediate the types and the strips of paper, a platen for each set of type for producing an impression of the corresponding type on the corresponding strip of paper, a manually controlled key for actuating the said platen, a toothed wheel on the said printing cylinder, a pawl for engaging the said toothed wheel, a lever carrying the pawl and actuated on pressing a key to lock the printing cylinder during the time an impression is made, a shaft on which rotates loosely the said printing cylinder, a spring connecting the said shaft and cylinder, and a gearing connecting the said shaft with the head block of the saw mill, to turn the printing cylinder according to the diameter of the log to be sawed.

13. The combination with the saw mill head block, of a recorder having a printing cylinder controlled by the said head block, and key-actuated impression means for making impressions of the type on the said printing cylinder.

14. The combination with the saw mill carriage having a head block, of a recorder mounted on the saw mill carriage and having a printing cylinder adapted to be turned from the said head block, the said cylinder having peripherally arranged sets of type representing board measure, paper feed mechanisms for feeding strips of paper over the sets of type, inking means for the sets of type, and key-controlled platens for the said sets of type to make impressions on the strips of paper.

15. The combination with a saw mill carriage, and a head block capable of transverse movement on the carriage and adapted to be set according to the diameter of the log to be cut into boards, of a recording mechanism for making a record of the board measure of the logs to be cut, the said recording mechanism including a record strip, and means for making a permanent record on said strip, the said recording mechanism having a part movable to accord with the diameter of the log to be cut and controlled by the movement of said head block, the said part being provided with means representing the board measure for different lengths of logs.

In testimony whereof I have signed my name to this specification in the presence of two subscribing witnesses.

JAMES WILLIAM PRESTON BURDINE.

Witnesses:
  D. A. RICHARD,
  C. C. RYBISKI.